United States Patent
Reddy et al.

(10) Patent No.: US 10,749,897 B2
(45) Date of Patent: *Aug. 18, 2020

(54) SHORT TERM CERTIFICATE MANAGEMENT DURING DISTRIBUTED DENIAL OF SERVICE ATTACKS

(71) Applicant: Cisco Technology, Inc., San Jose, CA (US)

(72) Inventors: Tirumaleswar Reddy, Bangalore (IN); Daniel Wing, San Jose, CA (US); Prashanth Patil, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/110,102

(22) Filed: Aug. 23, 2018

(65) Prior Publication Data

US 2019/0014146 A1 Jan. 10, 2019

Related U.S. Application Data

(62) Division of application No. 15/151,709, filed on May 11, 2016, now Pat. No. 10,104,119.

(51) Int. Cl.
| | |
|---|---|
| *H04L 29/06* | (2006.01) |
| *H04L 9/08* | (2006.01) |
| *H04L 9/14* | (2006.01) |
| *H04L 9/30* | (2006.01) |

(Continued)

(52) U.S. Cl.
CPC ........ *H04L 63/1458* (2013.01); *H04L 9/0861* (2013.01); *H04L 9/14* (2013.01); *H04L 9/30* (2013.01); *H04L 9/3263* (2013.01); *H04L 63/0236* (2013.01); *H04L 63/0823* (2013.01); *H04L 63/1425* (2013.01); *H04L 65/1006* (2013.01); *H04L 67/02* (2013.01);

(Continued)

(58) Field of Classification Search
CPC ........ H04L 9/14; H04L 63/1466; G06F 21/33
USPC .............................................................. 726/7
See application file for complete search history.

(56) References Cited

U.S. PATENT DOCUMENTS

| | | | |
|---|---|---|---|
| 7,010,683 B2 * | 3/2006 | Corella | H04L 9/002 |
| | | | 713/156 |
| 7,260,724 B1 | 8/2007 | Dickinson et al. | |

(Continued)

OTHER PUBLICATIONS

International Search Report and Written Opinion in counterpart International Application No. PCT/US2017/030042, dated Jul. 18, 2017, 10 pages.

(Continued)

*Primary Examiner* — Lynn D Feild
*Assistant Examiner* — Viral S Lakhia (57) ABSTRACT

In one embodiment, a distributed denial of service attack on a network is identified. In response to the distributed denial of service attack, a script to request a short term certificate is executed. The short term certificate is generated by a certificate server and received either directly or indirectly from the certificate server. An instruction to redirect traffic using the short term certificate and private key is sent to a distributed denial of service attack protection service that is operable to filter or otherwise mitigate malicious traffic involved in the distributed denial of service attack.

20 Claims, 6 Drawing Sheets

(51) Int. Cl.
*H04L 9/32* (2006.01)
*H04L 29/08* (2006.01)

(52) U.S. Cl.
CPC ............ *H04L 67/10* (2013.01); *H04L 69/329* (2013.01); *H04L 63/168* (2013.01)

(56) References Cited

U.S. PATENT DOCUMENTS

| | | | | |
|---|---|---|---|---|
| 7,363,495 | B2* | 4/2008 | Felt | G06Q 20/3829 |
| | | | | 713/170 |
| 8,327,128 | B1* | 12/2012 | Prince | H04L 63/0823 |
| | | | | 713/150 |
| 8,627,422 | B2* | 1/2014 | Hawkes | H04L 63/166 |
| | | | | 726/5 |
| 9,210,183 | B2* | 12/2015 | Sadovsky | G06F 3/0481 |
| 9,215,231 | B1* | 12/2015 | Bowen | H04L 63/1416 |
| 9,219,708 | B2* | 12/2015 | Anati | G06F 21/445 |
| 9,276,740 | B2* | 3/2016 | Nix | H04J 11/00 |
| 9,306,751 | B2* | 4/2016 | Wilson | G09C 1/00 |
| 9,641,343 | B1 | 5/2017 | Roskind et al. | |
| 9,830,479 | B2* | 11/2017 | Soja | G06F 21/72 |
| 10,027,694 | B1* | 7/2018 | Gupta | H04L 63/1458 |
| 10,091,171 | B2* | 10/2018 | Lohr | H04B 10/85 |
| 2007/0112948 | A1 | 5/2007 | Uhlik | |
| 2007/0214505 | A1 | 9/2007 | Stavrou et al. | |
| 2009/0187983 | A1* | 7/2009 | Zerfos | H04L 63/0823 |
| | | | | 726/10 |
| 2011/0173490 | A1* | 7/2011 | Narayanaswamy | ........................ |
| | | | | H04L 63/1408 |
| | | | | 714/4.11 |
| 2012/0174196 | A1 | 7/2012 | Bhogavilli et al. | |
| 2014/0282922 | A1 | 9/2014 | Iwanski et al. | |
| 2015/0150123 | A1* | 5/2015 | Be'ery | H04L 63/1416 |
| | | | | 726/22 |
| 2015/0180894 | A1 | 6/2015 | Sadovsky et al. | |
| 2015/0188945 | A1 | 7/2015 | Kjeldaas | |
| 2015/0256603 | A1 | 9/2015 | Pillai et al. | |
| 2015/0350167 | A1 | 12/2015 | Djakovic | |
| 2016/0027015 | A1 | 1/2016 | Redpath | |
| 2016/0219029 | A1* | 7/2016 | Oshida | H04L 67/1095 |
| 2016/0344725 | A1* | 11/2016 | Severin | H04L 9/006 |
| 2016/0352840 | A1* | 12/2016 | Negron | H04L 67/16 |
| 2017/0063544 | A1* | 3/2017 | Oxford | H04L 63/0435 |
| 2017/0093984 | A1* | 3/2017 | Dhanabalan | H04L 67/141 |
| 2017/0272415 | A1* | 9/2017 | Zhao | H04L 63/061 |
| 2017/0331854 | A1 | 11/2017 | Reddy et al. | |
| 2018/0048462 | A1* | 2/2018 | Salmela | H04W 12/06 |
| 2018/0144147 | A1* | 5/2018 | Nix | H04W 12/04 |

OTHER PUBLICATIONS

Barnes et al., Automatic Certificate Management Environment {ACME), drafl-ielf-acme-acme-02, Mar. 21, 2016, Inlernel Engineering Task Force.

Barnes et al., Automatic Certificate ManagemenlEnvironmenI{ACME), drall-barnes-acme-04, Jul. 21, 2015, Inlernel Engineering Task Force.

Barnes, Dane: Taking TLC Authentication to the Next Level Using DNSSEC, Oct. 2011, Internet Society.

Cloud Security, accessed Apr. 18, 2016, Akamai.com/us/en/cloud-security.jsp.

Dobbins et al., Use Cases for DDoS Open Threat Signaling, drafl-ielf-dols-use-cases-01.b<I, Mar. 21, 2016, Inlernel Engineering Task Force.

Migault, DDoS Open Threat Signaling uses Cases, drafl-mgll-dols-use-cases-00, Apr. 20, 2015, Internet Engineering Task Force.

Mortensen et al., Distributed Denial of Service {DDoS) Open Threat Signaling Requirements, drafl-ielf-dols-requiremenls-01, Mar. 18, 2016, Internet Engineering Task Force.

Prolexic Unveils New DDoS Mitigation Service at the 2012 RSA Conference, accessed Apr. 18, 2016, prweb.com/releases/2012/2/prweb9213291.

Quinn et al., Network Service Header, drafl-ielf-sfc-nsh-01.b<I, Jul. 23, 2015, Internet Engineering Task Force.

Sullivan, Keyless SSL: The Nilly Gritty Technical Details, Sep. 19, 2014, blog.cloudflare.com.

\* cited by examiner

SHORT TERM CERTIFICATE MANAGEMENT DURING DISTRIBUTED DENIAL OF SERVICE ATTACKS

CROSS-REFERENCE TO RELATED APPLICATION

This application is a divisional of and claims benefit to U.S. patent application Ser. No. 15/151,709, entitled "Short Term Certificate Management During Distributed Denial of Service Attacks", filed on May 11, 2016, the entirety of which is incorporated herein by reference.

TECHNICAL FIELD

This disclosure relates in general to the field of certificate management and mitigation of distributed denial of service (DDoS) attacks.

BACKGROUND

A denial of service (DoS) attack attempts to render a server or other network resource unavailable for legitimate users. The DoS originates with a single attacking system and internet protocol (IP) address. A DDoS attack extends the principle to multiple attackers. Multiple systems, often compromised systems, target the network resource at a coordinated time. The attacks may include hundreds or thousands of compromised systems. A botnet, which may be built through the distribution of a Trojan horse, may be used to gain control of the compromised systems. The attacks may flood the targeted network resource with traffic or requests.

DDoS mitigation or protection services protect networks with traffic filters that detect the denial of service attacks. The protection services may distinguish between requests from legitimate human users from requests originating with bots or hijacked web browsers. The protection services may examine traffic based on addresses, headers or signatures, using machine learning techniques, for example, to identify malicious traffic. In order to inspect layer 7 traffic, the DDoS mitigation or protection services must have access to layer 7 information (e.g., public and private keys).

BRIEF DESCRIPTION OF THE DRAWINGS

Exemplary embodiments of the present embodiments are described herein with reference to the following drawings.

DESCRIPTION OF EXAMPLE EMBODIMENTS

Overview

In an embodiment, a method includes identifying a distributed denial of service attack on a network, executing a script to request a short term certificate in response to the distributed denial of service attack, receiving the short term certificate generated by a certificate server, and generating an instruction to the protection service to process redirected traffic using the short term certificate and associated private key. Malicious traffic involved in the distributed denial of service attack is filtered by a protection service in response to the short term certificate.

In another embodiment, a method includes receiving a protection message indicative of a distributed denial of service attack on a network, receiving a short term certificate, generated in response to the distributed denial of service attack, and private key for a protected device coupled with the network, intercepting traffic for the network using the short term certificate, and filtering malicious traffic involved in the distributed denial of service attack in response to the short term certificate.

Example Embodiments

A distributed denial of service attack (DDoS) is an attempt to disrupt the services provided by a website or another internet based service. The attacker may include one or more of human hackers, scripts, or botnets. The botnets may include computers that have been hijacked, typically without the knowledge of the legitimate users. Botnets may be constructed when an open port or other vulnerability allows a Trojan horse to enter a computer connected to the internet wait for a scheduled coordinated attack with hundreds or thousands of other computers in the botnet.

The DDoS may include volumetric attacks, application layer attacks, or protocol attacks. In a protocol attack, a request or message generated under the requirements of a specific protocol are sent by the attacker. The protocol may include hypertext transfer protocol (HTTP), session initiation protocol (SIP), simple object access protocol (SOAP), or another protocol may be used. An example protocol attack is a slowloris attack in which partial HTTP requests are sent to the targeted server.

In a volumetric attack, the attacker attempts to overwhelm or flood a targeted device with requests or other types of data. The data itself may be harmless but the sheer volume of data (or sheer volume of a certain type of data) causes the targeted device to at least temporarily cease normal operation. The data may be internet control message protocol (ICMP) request, a user datagram protocol (UDP) request, or any type of spoofed packet. A spoofed packet is a packet that includes an address or other information that purports to be from a source that is forged or spoofed by the attacker.

In an application layer attack, the attacker targets a specific application or service offered by the targeted device. The application layer attack may include HTTP. Examples of specific applications include is a self-contained code that is executed by a server in response to a request from a client. A protocol attack involves protocol level requests such as ping or SYN requests.

Cloud based DDoS protection services, which are becoming increasingly popular, detect and mitigate emerging volumetric attacks, application layer DDoS attacks, or another type of attack. In order for the cloud based DDoS protection service to monitor traffic and mitigate the L7 attacks, the targeted device must provide public and private keys. In other words, the targeted device receives packets encrypted by the public key of the targeted device. To decrypt the packets, the targeted device uses its private key. Likewise, in order for the protection service to decrypt and inspect the packets, the protection service must have the private key. In one example, the packets may be transmitted using transport layer security (TLS) and the public and private keys are defined according to certificates exchanged in TLS.

Handing over the private key may be problematic for some users or some instances. Even if the threat is only temporary, the protection service will have the private key, and corresponding access, until the private key expires. In many examples, the expiration time extends far in the future such as a few years. Keys are set to expire in the distant future because of the high costs and efforts needed to issue and install the keys, which is often a manual process. It is an unnecessary risk for the protection service to retain the keys after the DDoS attack has been successfully mitigated or contained.

However, some of these downfalls are eliminated when the key issuing process is automated. For example, a script may be executed by the targeted device that require no human intervention. Automated key issuance means that keys may be assigned much shorted time durations. The following embodiments include DDoS protection using automatically issued keys that are short term. The targeted device on the enterprise system need still sends the keys to the protection service, but the keys may be revoked or expire after the attack is mitigated and/or contained.

Figure 1:
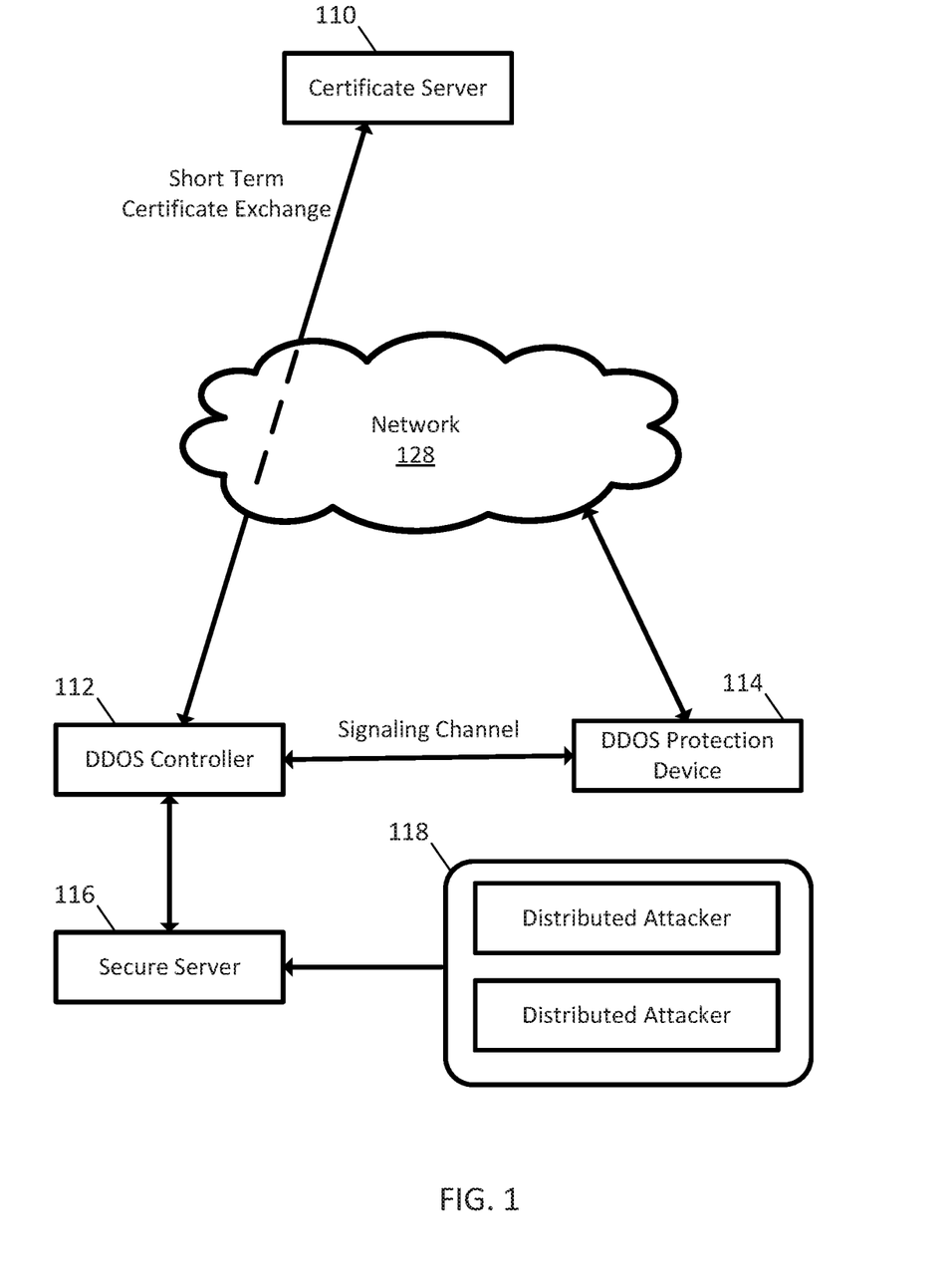
FIG. 1 illustrates an example system for short term certificate management.

FIG. 1 illustrates an example for short term certificate management. The system includes a certificate server 110, a DDoS controller 112, and a DDoS protection device 114 connected with a network 128. The system is also connected to a secure server 116 that may be threatened by DDoS attached from distributed attackers 118. The distributed attackers 118 may be servers, personal computers or other endpoints on any network from which the secure server 116 is reachable. Additional, different, or fewer components may be included.

The certificate server 110 may issue short term certificates or both short term certificates and long term certificates. A short term certificate may be temporally defined to have a predetermined duration or time until expiration. The predetermined duration may be 1 day (i.e., 24 hours), a number of days, or a number of weeks. In one example, the short term certificates are set to expire at a specific time of day (e.g., every day at midnight). A short term certificate may be defined by the way it is requested and issued. For example, short term certificates may be requested and/or issued according to an automated script.

The certificate server 110 may receive a request from the secure server 116 or the DDoS controller 112 to request a certificate. The DDoS controller 112 or the secure server 116 may execute the automated script that generates the request for the certificate. The request for the certificate may specify the predetermined duration for the short term certificate. The request may also include the address of the secure server 116 and/or the address of the DDoS protection service 114. The secure server 116 may trigger execution of the script to request the short term certificate in response to detection of the distributed denial of service attack.

The DDoS protection service 114 may inspect traffic intended for the secure server 116. The DDoS protection service 114 may block, rate-limit, delete, or quarantine illegitimate traffic. The DDoS protection service 114 may forward legitimate traffic to the secure server 116. The DDoS protection service 114 may distinguish between legitimate traffic and illegitimate traffic using a variety of techniques.

In one technique, the DDoS protection service 114 may extract address data (e.g., data indicative of an IP address or port number) from a packet. The address data may be indicative of a forwarding router (e.g., an ingress router of the network including the secure server 116). The DDoS protection service 114 compares the address data to an expected value or list of expected values based on the topology and a group of domain prefixes. However, the distributed attackers 118 may spoof IP addresses. The DDoS protection service 114 may compare other signatures in the attacks. The DDoS protection service 114 may identify patterns in the attacks using a machine learning algorithm or other techniques (e.g., neural network). In another technique, the DDoS protection service 114 may compare packets to one another. Duplicative packets from multiple sources may be indicative of a DDoS attack.

The DDoS protection service 114 may intercept all traffic received after a DDoS attack is detected and spread the packets out over time. For example, if one million data packets are received over an interval of one second, the DDoS protection service 114 may forward 1000 of the packets to the secure server 116 at a time for every time interval (e.g., 100 milliseconds).

In one embodiment, the DDoS controller 112 detects or identifies the DDoS attack and provisions the DDoS protection service 114, and in another embodiment, the DDoS protection service 114 continually monitors traffic and the DDoS protection service 114 identifies a distributed denial of service attack on a network. When the DDoS controller 112 detects the DDoS attack, the DDoS controller 112 may first determine whether the DDoS attack is too large to be handled by the DDoS controller 112. The DDoS controller 112 may be on-premises with the secure server 116 and intercept traffic destined for the secure server 116. The term on-premises may mean physically located in the same facility and/or building as the secure server 116, or the term on-premises may mean coupled with the same local network as the secure server 116.

When the DDoS attack is determined to be too large to be handled on-premises, a secure channel may be set up between the secure server 116 and the DDoS protection service 114. The short term certificates and associated private key are obtained from the certificate server 110 are transmitted from the secure server 116 to the DDoS protection service 114 over the secure channel. The secure channel may be defined according to TLS and a TLS handshake including at least one ClientHello message, at least one ServerHello message, and at least one key exchange for the short term certificate.

The DDoS controller 112 may perform DDoS open threat signaling (DOTS) as described by "draft-ietf-dots-use-cases-01" on tools.ietf.org and published on Mar. 21, 2016. When the DDoS controller 112 detects attack at Layer 7 or TLS on the secure server 116, and identifies that on premise security devices can no longer handle the attack, the DDoS controller 112 authenticates to the DDoS protection service 114, establishes a secure channel and signals the DDoS protection service 114 for help. The on premise security device can no longer handle the attack when bandwidth limits are exceeded or when the on premise security device lacks sufficient resources (CPU or memory) to mitigate the attack. The detection of the DDoS attack may be based on a volume of traffic. For example, a threshold level of traffic may be set and either the secure server 116 or the DDoS protection service 114 compares a current traffic level to the threshold level of traffic. Examples for the threshold level of traffic may include a DDOS limits at Layer 3 or Layer 4 such as a maximum number of full connections, a maximum number of half-open connections, a maximum number of connections per second, a threshold number packets per second or bytes per second or other intervals, and at Layer 7 may include maximum requests per second, or a maximum request size or other qualifications. The threshold level of traffic may be a variable level set by an administrator of the network or determined based on one or more factors. The one or more factors may include a size of the network, a number of devices on the network, or a connection type for the network.

The DDoS controller 112 may act as an automatic certificate management environment (ACME) client according to the proposal in "draft-ietf-acme-acme-02" published on Mar. 21, 2016 by tools.ietf.org. The ACME client requests short term certificates for secure servers under attack from the certification authority (CA) or certificate server acting as an ACME server.

The secure server 116 may select the predetermined duration according to the particular application for which the certificate is intended (e.g., a duration for the short term attack depends on the type of attack). DDOS attacks may last from few hours to a week. If the DDOS attack lasts longer than the predetermined duration, then the secure server 116 or the DDOS controller 112 acting as ACME client requests a new short term certificate from certificate server 110 (or the ACME server). The value of the predetermined interval must not be too low or too high in order to minimize inefficiencies in requesting new short term certificates.

The traffic intended for the secure server 116 may be redirected to the DDoS protection service 114 using one or more methods. In one example, the secure server 116 generates and advertises a border gateway protocol (BGP) message, which may be referred to as a BGP announcement. In another example, the DDoS protection service 114 may generate and advertise the BGP message.

The BGP message or BGP announcement steers subsequent traffic to the DDoS protection service 114 before it reaches the protected network. BGP is a gateway protocol for the exchanging routing and reachability information between networks. The BGP message may include the address of the DDoS protection service 114 so that routers redirect packets intended for the secure server 116 to the DDoS protection service 114. The BGP message may include the prefixes for the affected traffic (e.g., for example 100.200.300.* includes all addresses with the prefix 100.200.300).

A tunnel may be established between the DDOS controller 112 and the DDoS protection service 114. The tunnel between the DDOS controller 112 and the DDoS protection service 114 may facilitate generic routing encapsulation (GRE) or another encapsulation technique. A GRE tunnel forwards incoming traffic from a DDoS protection service 114 to the DDOS controller 112. A forwarded data packet may include the GRE encapsulation, metadata, and the original packet received at the protected network.

The DDoS controller 112 may switch or coordinate BGP advertisements along with the transition between short term certificates and long term certificates. Before a DDoS attack is detected the secure sever 116 generates a BGP message (first message) listing local addresses for the protected network. When a DDoS attack is detected, the secure server 116 generates a BGP message (second message) listing a device for the DDoS protection service 114. The DDoS controller 112 may send monitoring updates to the secure server 116 when the DDoS attack is mitigated or filtered. When the DDoS attack ceases, or it is determined that the threat has subsided, the DDoS controller 112 may update the secure server 116, which generates a BGP message (third message) that lists the local address in order to continue with normal operation.

Alternatively, domain name system (DNS) records may be modified to redirect traffic to the DDoS protection service 114. That is the secure server 116 or DDoS controller 112 may generate a request for a DNS server to modify the DNS records associated with the secure server to point to the DDoS protection service 114.

In one example, the secure server 116 requests and the certificate server 110 issues short term certificates in all circumstances. When a DDoS attack occurs, the current short term certificated is provided to the DDoS protection service 114. However, when no attack occurs, no certificates are provided to the DDoS protection service 114. Because the certificates are short term and expire on a regular basis, there are no concerns with subsequent access by the DDoS protection service 114.

In another example, the DDoS controller 112 may switch between requesting short term certificates and long term certificates. The request may include a flag that indicates whether a long term certificate or a short term certificate is requested. The DDoS controller 112 may request, and the certificate server 110 provides, long term certificates until a DDoS attack is detected. In response to the detection of the DDoS attack, the DDoS controller 112 may request, and the certificate server 110 provide, one or more short term certificates. The DDoS controller 112 may monitor the DDoS attack and when the DDoS attack ceases, or it is determined that the threat has subsided, the DDoS controller 112 may request a long term certificate, continuing with normal operation.

The certificate server 110 may receive a request from the secure server 116 or the DDoS controller 112 to request a certificate. The secure server 116 may execute the automated script that generates the request for the certificate. The request for the certificate may specify the predetermined duration for the short term certificate. The request may also include the IP addresses and fully qualified domain name (FQDN) of the secure server 116 and/or the address of the DDoS protection service 114. The secure server 116 may trigger execution of the script to request the short term certificate in response to detection of the distributed denial of service attack.

Figure 2:
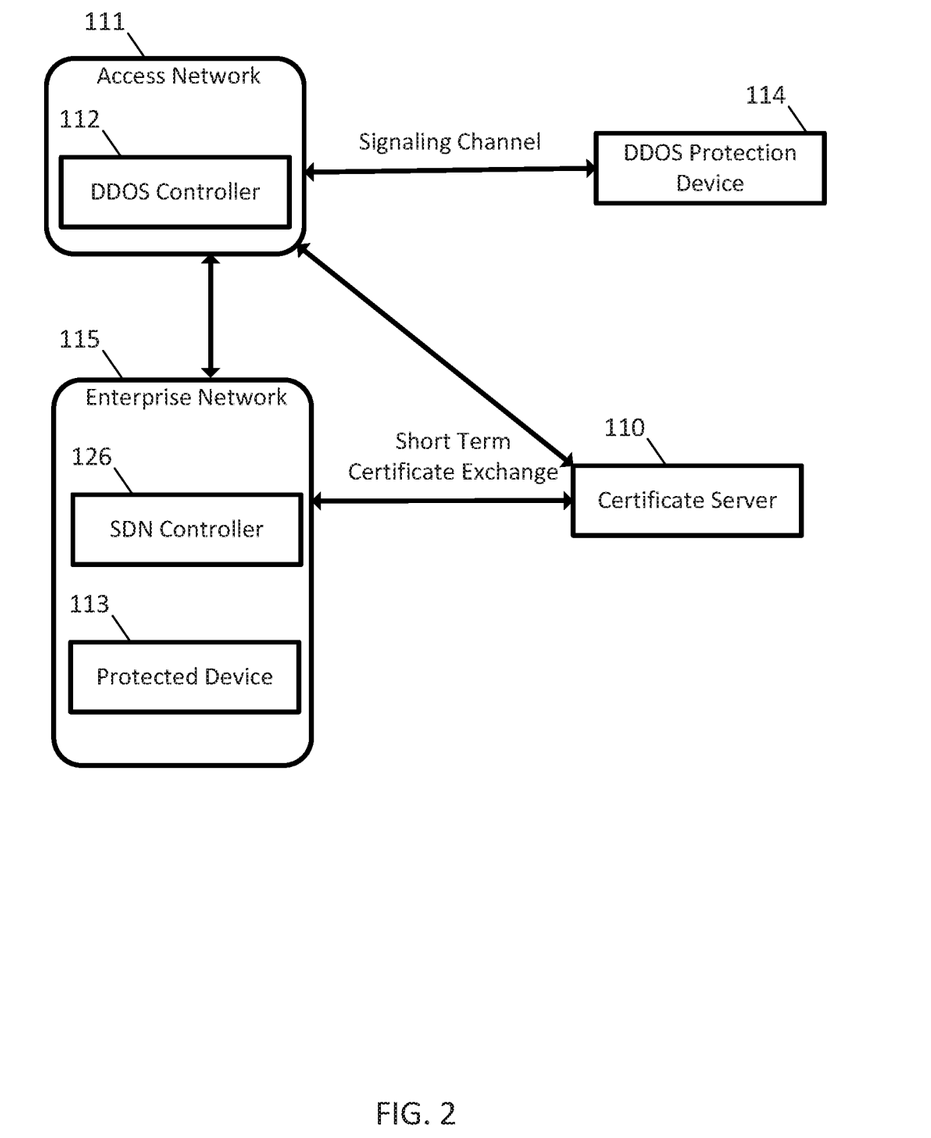
FIG. 2 illustrates another example system for short term certificate management.

FIG. 2 illustrates another example system for short term certificate management. The system includes an access network 111 and an enterprise network 115. The access network 111 and/or the enterprise network 115 are coupled with a certificate server 110 via a secure channel for short term certificate exchange. The access network 111 is coupled with a DDoS protection device 114 via a signaling channel. The enterprise network 115 leverages security services offered by the service provider via the access network 111. Additional, different, or fewer components may be included.

The enterprise network 115 includes at least a protected device 113 and a software defined networking (SDN) controller 126. The protected device 113 may refer to a server, a client, or an endpoint coupled with the access network. A SDN controller makes decisions about how traffic is forwarded among the nodes of the network, but the underlying nodes remain responsible for the forwarding of traffic. In some examples, only the access network 111, and/or specifically the SDN controller 126 is coupled with the certificate server 110.

The access network 111 includes at least one security device such as a DDoS controller 112. The access network 111 provides access from the enterprise network 115 to an external network (e.g., the internet) through interaction and instruction from the SDN controller 126. The access network 111 may be a service provider network.

The DDoS controller 112 in the service provider network may act as a TLS proxy for the enterprise network 115 or the protected device 113. The TLS proxy may monitor the communications between the enterprise network 115 and the external network. The TLS proxy may perform a TLS handshake. The TLS handshake may be Diffie-Hellman handshake with one or more servers in the external network. Either public-key cryptosystems, the encryption key is public and the decryption key is kept secret. The TLS handshake may include at least one ClientHello message, at least one ServerHello message, and at least one key exchange. Through the TLS proxy, the DDoS controller 112 is configured to detect attacks at Layer 7 or through the TLS connection.

When the DDoS controller 112 detects the DDoS attack, the DDoS controller 112 may first determine whether the DDoS attack is too large to be handled by the DDoS controller 112. When the DDoS attack is determined to be too large to be handled by the DDoS controller 112, a secure channel may be set up with the DDoS protection service 114. For example, the DDoS controller 112, acting as a TLS proxy may authenticate to or perform a handshake with the DDoS protection service 114.

The short term certificates obtained from the certificate server 110 are transmitted over the secure channel. For example, the DDoS controller 112 may request that the SDN controller 126 provide short term certificates. In response, the SDN controller 126 may act as an ACME client as described above, sending a request for a short term certificate from the certificate server 110. The request may include a time interval for the short term certificate. The conveyance of the short term certificate from the certificate server 110 to the SDN controller 126 is a first conveyance.

After receiving the short term certificate from the certificate server 110, the SDN controller 126 forwards the short term certificate to the DDoS controller 112. The transmission of the short term certificate from the SDN controller 126 to the DDoS controller 112 is a second conveyance. The DDoS controller 112 sends the short term certificate to the DDoS protection service 114 using the secure channel, which is a third conveyance.

The DDoS protection service 114 may generate a BGP announcement for multiple addresses affiliated with the enterprise network 115. At least one of the addresses may correspond to protected device 113. The BGP announcement causes one or more devices in the external network to direct packets originally addressed to the enterprise network 115 to the DDoS protection service 114.

The DDoS protection service 114 receives the packets including those part of a DDoS attack. The DDoS protection service 114 may mitigate or block the DDoS attack. The DDoS protection service 114 may filter the traffic to remove packets that are part of the DDoS attack. When a predetermined time has passed since any packets for the DDoS attack have been received, the DDoS protection service 114 determines that the DDoS attack has ended. In response to the DDoS attack ending, the DDoS protection service 114 generates an all clear message, which is sent to the DDoS controller 112.

Also in response to the DDoS attack ending, the DDoS protection service 114 may generate a BGP announcement for multiple addresses affiliated with the enterprise network 115 to direct packets to the enterprise network 115 rather than the DDoS protection service 114.

In response to the all clear message, the DDoS controller 112 may generate a revocation message for the short term certificate. The DDoS controller 112 may instruct the enterprise network 115 to revoke the short term certificate. In turn, the SDN controller 126 may sent a revocation message to the certificate server 110. The revocation message may include an identifier for the issuing certificate authority, an address for the DDOS controller, and/or an address for the DDoS protection service 114.

In one alternative, the short term certificates are applied during a DDoS attack using DNS-based Authentication of Named Entities (DANE), which allow certificates to be bound to DNS names using Domain Name System Security Extensions (DNSSEC). Under DANE, a TLSA record includes how a TLS certificate chain is matched against the TLSA record and a certificate with which the TLS certificate chain is matched. When the DDoS controller 112 identifies a DDoS attack, the DDoS controller requests short term certificates and updates the TLSA record with the new certificate details. A short time to live (TTL) value may be used for the TLSA record so the client after the TTL expiry can query and determine if the TLSA record is updated or not, and convey the short term certificate to the DDoS server 115. When the DDoS attack has stopped, the DDoS controller 112 modifies the TLSA record to remove the short term certificate details and include a previous valid certificate or a new certificate.

Figure 3:
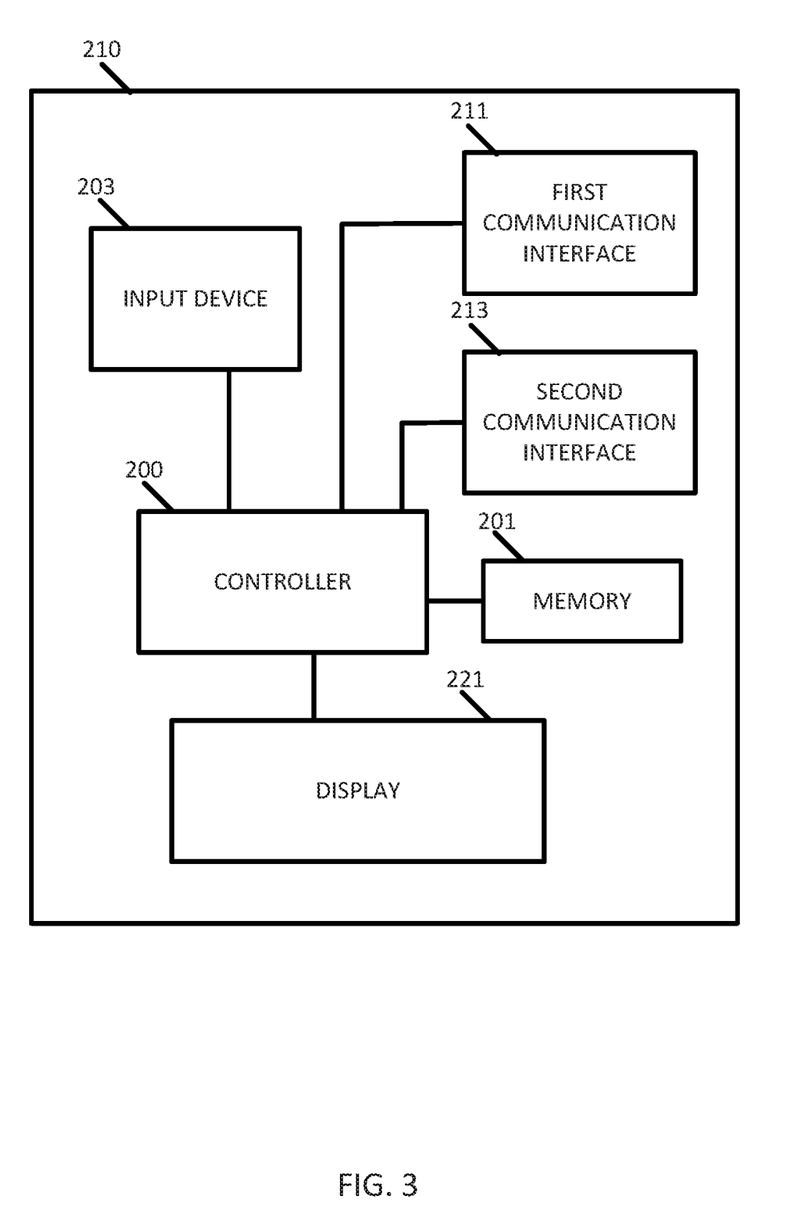
FIG. 3 illustrates an example DDoS controller.
Figure 4:
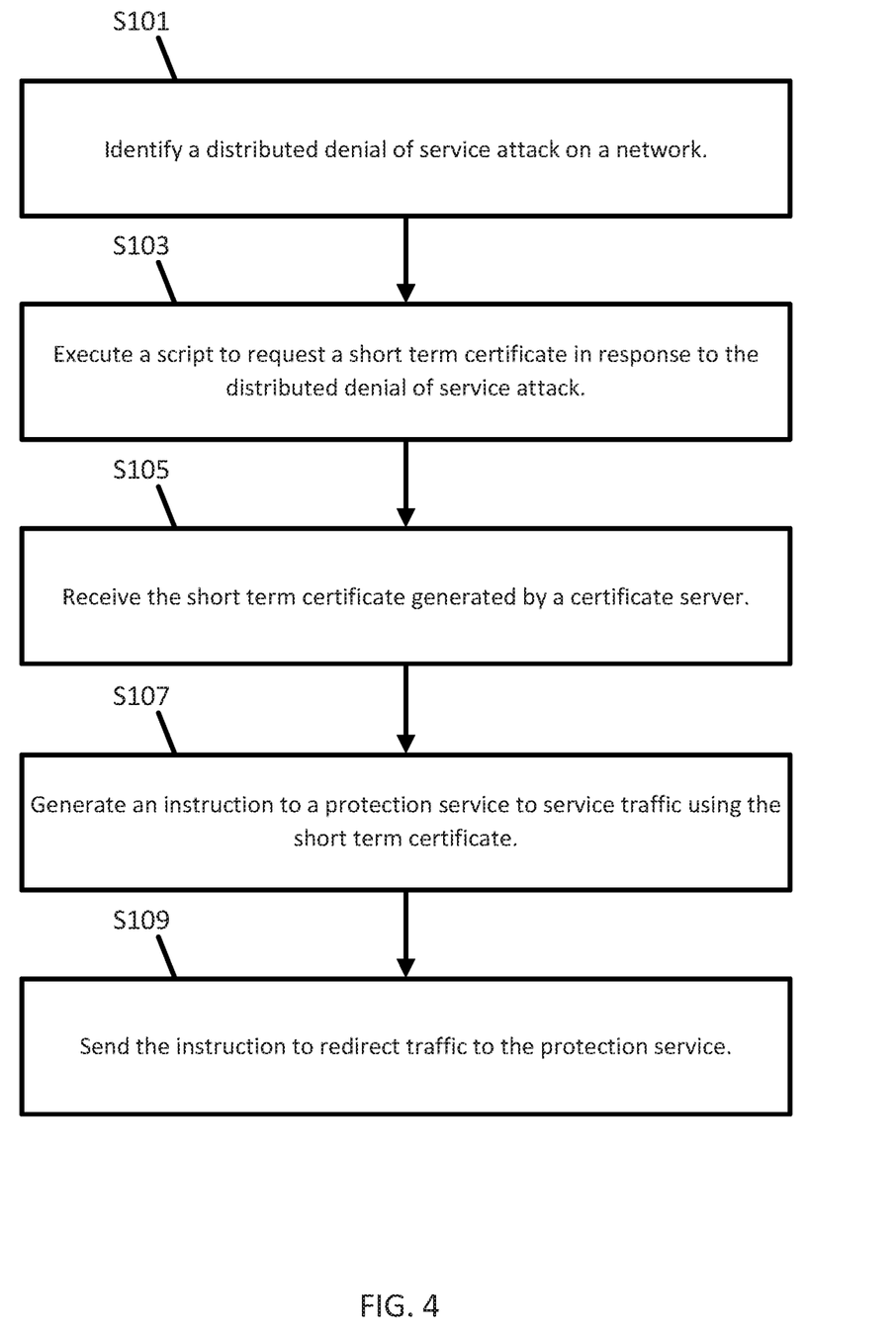
FIG. 4 illustrates an example flowchart for the DDoS controller of FIG. 3.

FIG. 3 illustrates an example computing device 210, which corresponds, for example, to the DDoS controller 112. The computing device 210 includes a controller 200, a memory 201, an input device 203, a first communication interface 211, a second communication interface 213, and a display 221. Additional, different, or fewer components may be provided. Different network devices may have the same or different arrangement of components. FIG. 4 illustrates an example flowchart for the computing device 210 of FIG. 3. Additional, different, or fewer acts may be included.

At act S101, the controller 200 is configured to identify a distributed denial of service (DDoS) attack on a network. The computing device 210 may be a passive device that functions as a sensor to identify a spike in traffic flow to the network. The computing device 210 may be an on premise security device coupled with the network. The computing device 210 may be coupled with a service provider network. The controller 200 may compare current traffic levels to previous traffic levels or an average of traffic levels.

The detection of the DDoS attack may be based on network characteristics defining an attack telemetry. In addition to the amount of traffic, the network characteristics may include a source of data, a time between messages, or a sequence number of messages. Some sources of data (e.g., particular IP addresses) may be whitelisted, and accordingly, removed from the attack telemetry. The time between messages, when higher than a threshold value, may be indicative of a DDoS attack. The sequence of messages, for example when messages are received in an expected sequence, even if above a threshold volume level, may be ignored in the attack telemetry.

At act S103, the controller 200 executes a script to request a short term certificate in response to identification of the distributed denial of service attack. The script may generate one or more messages for a trusted third party such as a certificate authority. The script may specify the trusted third party device by address or name. The script may include alternate third party devices for the short term certificate. The script may include a time frame for the short term certificate. The user of the computing device 210 may enter the script or specify the time frame, trusted third party, addresses, or other information using the input device 203. The user may confirm the entered information using the display 221.

In one embodiment, the first communication interface 211 handles outgoing communication for the computing device 210, and the second communication interface 213 handles incoming communication for the computing device 210. In another example, the first communication interface 211 handles communication between the computing device 210 and a first network (e.g., local network or enterprise network), and the second communication interface 213 handles communication between the computing device 210 and a DDoS mitigation or prevention service.

At act S105, the controller 200 or the second communication interface 213 receives the short term certificate generated by the trusted third party or certificate server. The controller 200 may record a copy of the short term certificate and a time interval for the short term certificate in the memory 201. The controller 200 (e.g., corresponding to the DDoS controller) may set the time period. At act S107, the controller 200 generates an instruction to the protection service 114 to service traffic using the short term certificate and the time period.

At act S109, the first communication interface 211 or the second communication interface 213 sends the request to a protection device hosted by a cloud service. The protection device, as described above, is configured to mitigate or prevent the attack by filtering malicious traffic involved in the distributed denial of service attack. The filtered or scrubbed traffic may be sent from the DDoS protection service 114 to the Enterprise network 115 using a GRE tunnel or other tunneling or encapsulation technique. A GRE tunnel is set up between the DDoS protection service 114 and the DDOS controller 112.

The protection device operates in response to the short term certificate. When the controller 200 determines that the attack or threat of attack is over, the controller 200 generates and sends an instruction or request to revoke the short term certificate to the certificate server. In another example, the controller 200 may send the request to the protection device, which can stop the DDoS attack mitigation algorithm.

Figure 5:
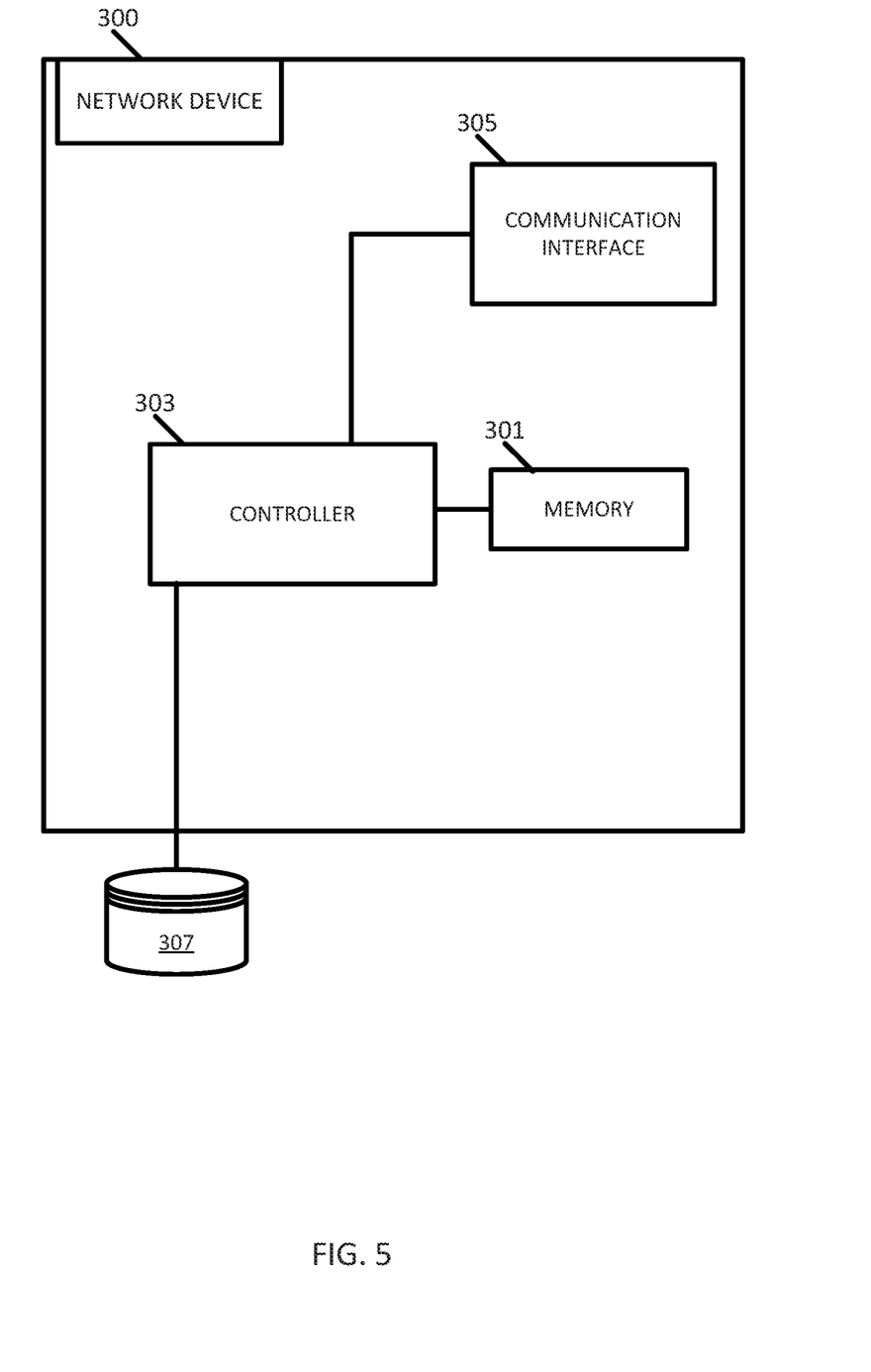
FIG. 5 illustrates an example network device.
Figure 6:
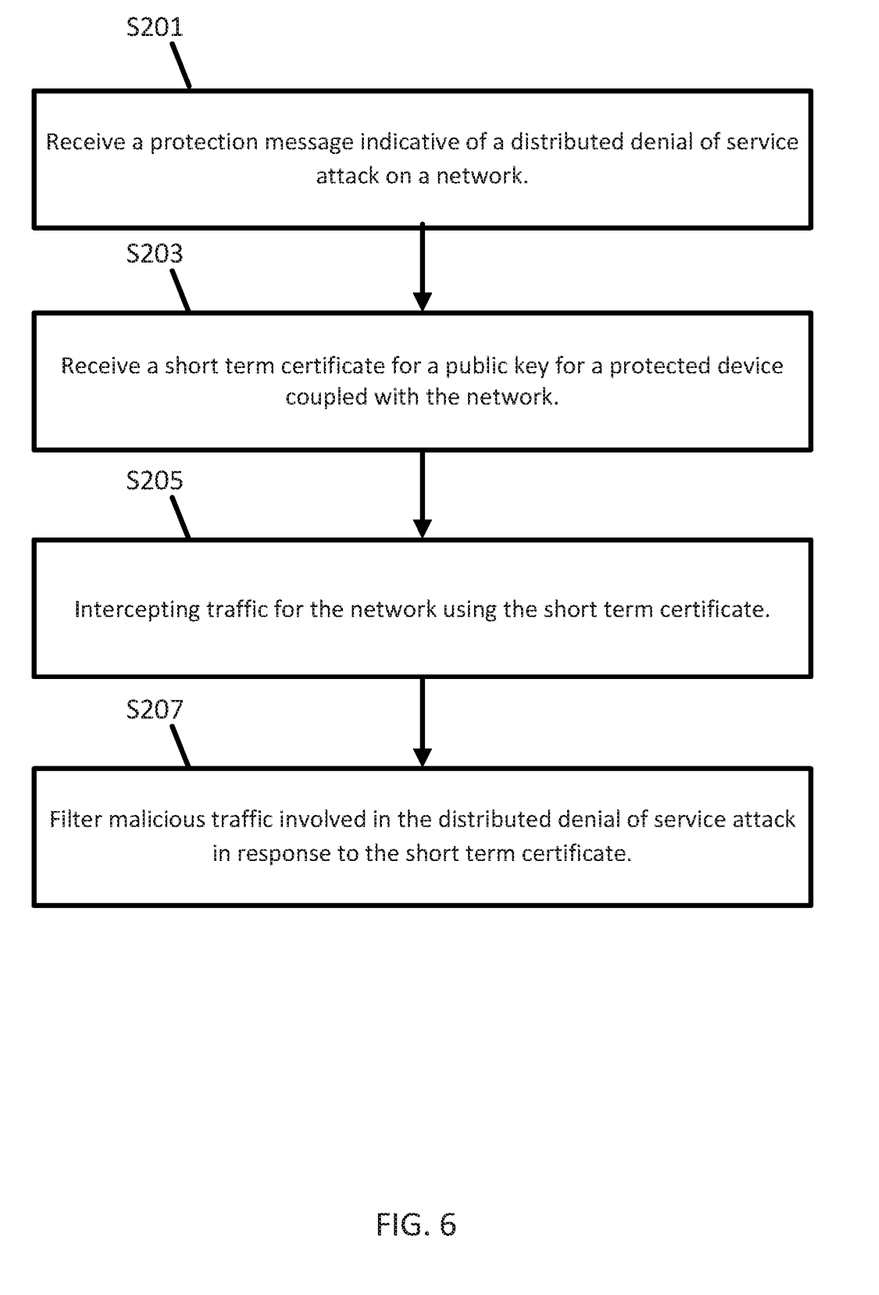
FIG. 6 illustrates another example flowchart for the network device of FIG. 5.

FIG. 5 illustrates an example network device 300, which may correspond to the DDoS protection service 114. The network device 300 includes at least a memory 301, a controller 303, and a communication interface 305. Additional, different, or fewer components may be provided. Different network devices may have the same or different arrangement of components. FIG. 6 illustrates another example flowchart for the network device of FIG. 5 such as the operation of the server device 120. Additional, different, or fewer acts may be included.

At act S201, the controller 303 or the communication interface 305 receives a protection message indicative of a distributed denial of service attack on a network. The protection message may be generated by a DDOS controller at a local area network or a service provider network.

At act S203, the controller 303 or the communication interface 305 receives a short term certificate for a public key for a protected device coupled with the network. The short term certificate is generated in response to the distributed denial of service attack.

At act S205, the controller 303 intercepts traffic for the network using the short term certificate. The network device 300 may be a high capacity network with one or more high capacity interfaces or high capacity connections. The high capacity network is configured to handle traffic at so high of a bandwidth as to not be affect by DDoS attacks.

At act S207, the controller 303 filters malicious traffic involved in the distributed denial of service attack in response to the short term certificate. The controller 303 may scrub, filter or inspect traffic based on attributes of traffic include any combination of IP addresses, cookie variations, HTTP headers, and Javascript footprints.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The controller 200 and/or the controller 303 may include a general processor, digital signal processor, an application specific integrated circuit (ASIC), field programmable gate array (FPGA), analog circuit, digital circuit, combinations thereof, or other now known or later developed processor. The controller 303 may be a single device or combinations of devices, such as associated with a network, distributed processing, or cloud computing.

The memory 201 and/or the memory 301 may be a volatile memory or a non-volatile memory. The memory 203 or 301 may include one or more of a read only memory (ROM), random access memory (RAM), a flash memory, an electronic erasable program read only memory (EEPROM), or other type of memory. The memory 301 may be removable from the network device 103, such as a secure digital (SD) memory card.

In addition to ingress ports and egress ports, the communication interface may include any operable connection. An operable connection may be one in which signals, physical communications, and/or logical communications may be sent and/or received. An operable connection may include a physical interface, an electrical interface, and/or a data interface.

The computing device 210 may include only the first communication interface 211 or both the first communication interface 211 and the second communication interface 213. In one example, the first communication interface 211 may coordinate incoming communication and the second communication interface 213 may coordinate outgoing communication. Different interfaces for any combination of the first communication interface 211, the second communication interface 213, and the communication interface 305 of the network device 200 may be assigned to wireless (the IEEE 802.11 family of protocols), cellular communications, voice of internet protocol (VoIP), email, instant messaging, session initiation protocol (SIP), extensible messaging and presence protocol (XMPP), microblog submissions (Twitter or status messages), other forms of communication.

The communication interface 305, the first communication interface 211 and/or the second communication interface 213 may communicate using network 128, which may occur through the transport layer is part of an open system interconnection (OSI) model that defines a networking framework for implementing protocols in seven layers. Control in this model is passed from one layer to the next, starting at the seventh layer and proceeding to the first layer. The layers from the seventh to the first are application, presentation, session, transport, network, data-link, and physical. The fourth layer (L4) is the transport layer. The network 128 may include one or more transmission control protocol/internet protocol (TCP/IP) networks. Additional, different, or fewer components may be included.

The input device 203 may be one or more buttons, keypad, keyboard, mouse, stylist pen, trackball, rocker switch, touch pad, voice recognition circuit, or other device or component for inputting data. The input device 203 and the display 221 may be combined as a touch screen, which may be capacitive or resistive. The display 221 may be a liquid crystal display (LCD) panel, light emitting diode (LED) screen, thin film transistor screen, or another type of display. The display 221 is configured to display the first and second portions of the content.

The memory 201 and 301 are non-transitory computer-readable media, which may be a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A method of using a short term certificate during a distributed denial of service attack on a network, the method comprising:
   receiving a protection message indicative of a distributed denial of service attack on a network that is associated with a first certificate and a protection service;
   receiving, for the protection service, a short term certificate and an associated private key that are generated in response to, and at a time of, identifying the distributed denial of service attack, wherein the short term certificate has a predetermined duration that is less than a duration of the first certificate, and which predetermined duration of the short term certificate is selected based on a type of the distributed denial of service attack;
   intercepting, by a processor of the protection service, traffic for the network using the short term certificate;
   filtering, by the processor of the protection service, malicious traffic involved in the distributed denial of service attack in response to the short term certificate, to produce filtered traffic; and
   providing the filtered traffic to the network.

2. The method of claim 1, wherein the distributed denial of service attack is identified by an on premise security device coupled with the network.

3. The method of claim 1, wherein the distributed denial of service attack is identified by a security device in a service provider network.

4. The method of claim 1, further comprising:
   advertising a gateway protocol message including an address for the protection service.

5. The method of claim 4, further comprising:
   advertising a gateway protocol message including an address for the network after an end of the distributed denial of service attack.

6. The method of claim 1, further comprising:
   generating an instruction to revoke the short term certificate to a certificate server.

7. The method of claim 1, wherein the short term certificate expires in less than one day.

8. The method of claim 1, wherein the short term certificate is issued from an automated script.

9. The method of claim 1, further comprising:
   establishing a secure channel between the protection service and the network.

10. An apparatus for using a short term certificate during a distributed denial of service attack on a network that is associated with a protection service and a first certificate, the apparatus comprising:
    a communication interface configured to receive, for the protection service, a short term certificate for a public key and an associated private key, wherein the short term certificate and the associated private key are generated in response to, and at a time of, identifying the distributed denial of service attack, wherein the short term certificate has a predetermined duration that is less than a duration of the first certificate, and which predetermined duration of the short term certificate is selected based on a type of the distributed denial of service attack; and a distributed denial of service attack (DDoS) protection controller associated with the protection service, the DDoS protection controller comprising a processor configured to execute instructions to:
  identify traffic for the network using the short term certificate and the associated private key;
  filter malicious traffic involved in the distributed denial of service attack in response to the short term certificate, to produce filtered traffic; and
  provide the filtered traffic from the protection service to the network.

11. The apparatus of claim 10, wherein the distributed denial of service attack is identified by an on premise security device coupled with the network.

12. The apparatus of claim 10, wherein the distributed denial of service attack is identified by a security device in a service provider network.

13. The apparatus of claim 10, wherein the processor of the DDoS protection controller is further configured to execute instructions to advertise a gateway protocol message including an address for the protection service.

14. The apparatus of claim 13, wherein the processor of the DDoS protection controller is further configured to execute instructions to advertise a gateway protocol message including an address for the network after the distributed denial of service attack ends.

15. The apparatus of claim 10, wherein the short term certificate expires in less than one day.

16. The apparatus of claim 10, wherein the short term certificate is issued from an automated script.

17. The apparatus of claim 10, wherein the processor of the DDoS protection controller is further configured to execute instructions to establish a secure channel between the protection service and the network.

18. A non-transitory computer readable storage media encoded with instructions that, when executed by a processor, cause the processor to perform operations for using a short term certificate during a distributed denial of service attack on a network, the operations including:
  receiving a protection message indicative of a distributed denial of service attack on a network that is associated with a first certificate and a protection service;
  receiving, for the protection service, a short term certificate and an associated private key that are generated in response to, and at a time of, identifying the distributed denial of service attack, wherein the short term certificate has a predetermined duration that is less than a duration of the first certificate, and which predetermined duration of the short term certificate is selected based on a type of the distributed denial of service attack;
  intercepting, by a processor of the protection service, traffic for the network using the short term certificate;
  filtering, by the processor of the protection service, malicious traffic involved in the distributed denial of service attack in response to the short term certificate, to produce filtered traffic; and
  providing the filtered traffic to the network.

19. The non-transitory computer readable storage media of claim 18, further comprising instructions for:
  advertising a gateway protocol message including an address for the protection service.

20. The non-transitory computer readable storage media of claim 18, further comprising instructions for:
  advertising a gateway protocol message including an address for the network after the distributed denial of service attack ends.

* * * * *